United States Patent [19]

McMahon

[11] 4,017,745
[45] Apr. 12, 1977

[54] SWITCHING REGULATOR POWER SUPPLY

[75] Inventor: William Henry McMahon, Salt Lake City, Utah

[73] Assignee: American Laser Corporation, Salt Lake City, Utah

[22] Filed: Feb. 11, 1976

[21] Appl. No.: 657,157

[52] U.S. Cl. .......................... 307/254; 307/296 A; 323/22 T
[51] Int. Cl.² ...................................... H03K 17/60
[58] Field of Search .......... 307/254, 242, 243, 296; 323/22 T, D1

[56] References Cited

UNITED STATES PATENTS

| | | | |
|---|---|---|---|
| 3,319,088 | 5/1967 | Payne | 307/242 |
| 3,636,476 | 1/1972 | Milberger | 307/243 |
| 3,699,358 | 10/1972 | Wilkinson | 307/242 |
| 3,778,639 | 12/1973 | Higuchi et al. | 307/254 |
| 3,952,748 | 4/1976 | Kaliher et al. | 323/D1 |

*Primary Examiner*—Stanley D. Miller, Jr.
*Assistant Examiner*—B. P. Davis
*Attorney, Agent, or Firm*—B. B. Olive

[57] ABSTRACT

An improved switching regulator circuit is adapted for use with switch regulators in which more than one transistor is operated in parallel to provide a higher output current than normally obtained. Each transistor is operated with a separate inductor or filter on either the emitter or collector side of the transistor and each transistor possesses its own flyback diode.

9 Claims, 3 Drawing Figures

SWITCHING REGULATOR POWER SUPPLY

BACKGROUND OF THE INVENTION

1. Field of the Invention:

This invention relates to power supply circuits and specifically to series switching regulator power supplies utilizing transistors operated in parallel.

2. Description of the Prior Art:

It is the characteristic of switching transistors that the switching response varies significantly from transistor to transistor. This characteristic exhibits itself in the form of a slightly varying saturation voltage, i.e., the voltage across the transistor when it is conducting and has adequate base drive to maintain a minimum voltage drop across the transistor. The difference between transistors also is exhibited in the form of frequency response which shows up as differing slopes on the leading edge and trailing edge of a pulse when the transistor is turned on and off with a fast rectangular waveform. The transistor also exhibits different storage times. The storage time is the duration of conduction after the base drive is removed.

In the art of developing high reliability power supplies, it is known to have a power supply in which a DC power is generated by conventional means and the power supply is voltage or current regulated by switching the load on and off at a high rate by using switching transistors. It is also known to filter the DC output between the switch mechanism and the load. It is characteristic of high voltage, high speed, switching transistors that they be limited to collector currents of the order of 5 to 20 amperes and are generally limited to about 5 amperes for efficient, reliable, high voltage regulation.

A common technique is to parallel more than one transistor to increase the current and reduce the load on each single transistor. When this is done, the transistors exhibit differing switching characteristics and a single transistor usually ends up carrying an inordinate share of the current during some period of the switching cycle. To reduce that problem, emitter resistors and emitter transformers have been employed. These devices attempt to sense the emitter current and alter the distribution of base drive between the transistors in an attempt to balance the emitter currents. However, since a switching regulator operates the transistor as a switch, the transistor is not necessarily capable of being driven by the base in such a fashion that balance is accomplished. This can be seen by noting that in a group of transistors, if one transistor is slower than its companion transistors, no amount of base drive will necessarily make it as fast. Therefore, after all the fast transistors have ceased conducting in a turn off cycle, the slow transistor may continue to conduct, and subsequently fail.

SUMMARY OF THE INVENTION

A switching regulator circuit according to the invention involves a plurality of switching transistors operated in parallel. Each switching transistor is connected to a filter such that each respective transistor provides current to the load in an independent manner and is buffered from adjacent transistors by its own respective filter. Each individual inductor stores a given amount of energy during the conduction phase of the switching cycle. This results in each inductor-transistor combination providing a comparable share of energy to the load in the form of a given amount of current at the sustained voltage. In other words, the inductor provides the transistor with a specific impedance. This impedance regulates the amount of current which the transistor delivers to its individual inductor during the conduction phase of the switching cycle. That current, at the sustained voltage, determines the amount of energy stored in the inductor by the equation $E = LI^2$, where $L$ is the inductance and $I$ is the current. The incremental change in current, provided by the transistor during the on cycle of the switching waveform, therefore determines the sustained current at the output. It has, therefore, been established that the equal set of inductors being driven, each individually by its respective transistors and switching diode, forms a balanced set of drivers which can provide a suitable output current. The conducted current is balanced between transistors by means of emitter resistors. The net output of the composite transistors is then controlled by the duty factor of the common input waveform to the transistors.

In the case of a series type switching regulator circuit, where the load is on the collector side of the transistor, the collector is attached to a filter which is attached to the load and such arrangement is used with the transistor-filter arrangement previously explained. Each transistor operates with a separate flyback diode. The flyback diode serves to conduct the current generated by the respective filter during the time the transistor is in a non-conducting state. The described type of circuit exhibits a characteristic such that when all transistors are switched in a nearly coherent manner, the individual filter inductors appear to the circuit as being in parallel. Therefore, the net inductance of these inductors is found to be reduced proportional to the number of units operating in parallel.

Where a large number of transistors are operating in parallel, e.g., more than four, there is placed in series with the described transistor-filter configuration, the composite of the individual filters and which is capable of handling the combined current. This latter mentioned composite filter is attached to the conventional switching capacitor and subsequently to the load. The switching regulator circuitry of the invention is applicable to various forms of switching regulators in which more than one transistor is operated in parallel.

The invention circuitry may be employed in a switching regulator operated in either a current or voltage regulator mode as determined by the reference signal which is sensed to control the switching drive. In accordance with prior art practice, the transistor itself operates as a switch which is controlled by a rectangular waveform. The duty factor or the ratio of conducting is controlled by the period and frequency of the driving waveform. This duty factor can be established by having the rectangular waveform repeat at a fast frequency and the pulse width vary from zero to maximum. In another known practice, the pulse width is maintained at a fixed value and the frequency of pulses is varied over some band width to establish the duty factor.

DESCRIPTION OF THE PREFERRED EMBODIMENT

Figure 1:
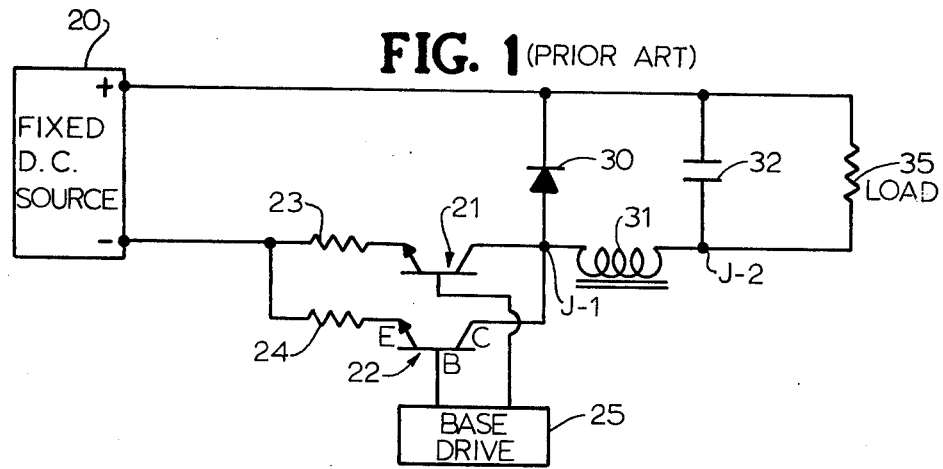
FIG. 1 illustrates in schematic form a typical prior art series switching regulator circuit of the type to which the invention is applicable.

Reference is made to FIG. 1 illustrating a conventional switching regulator circuit of a type to which the invention circuitry can be implied. In the conventional system, a fixed DC power supply 20 is arranged to have its output switched by a pair of switching transistors 21, 22, each having a base B, collector C, and emitter E. Emitter resistors 23, 24 are connected as shown and the bases of the respective transistors 21, 22 are connected to an appropriate base drive 25. A flyback diode 30 is connected across the power supply output as illustrated and an inductor 31 and capacitor 32 provide a filter action for the load 35. In operation, the control circuit provided by base drive 25 causes transistors 21, 22 to switch on and off at a predetermined frequency to control the output voltage $V_o$.

The problem dealt with by the invention with respect to a circuit configuration of the type illustrated by FIG. 1 concerns the inability of the transistors to switch at exactly the same time and in exactly the same fashion when connected in a configuration such as illustrated in FIG. 1. For example, transistor 21 may inherently operate at a different rate than transistor 22 in a particular cycle. Thus, transistor 21 may, for example, continue to conduct after transistor 22 has turned off in the cycle. In any event, an unbalance of current through the transistors 21, 22 is obtained and which inherently affects the maximum amount of collector current that can be employed in such a conventional circuit.

Figure 2:
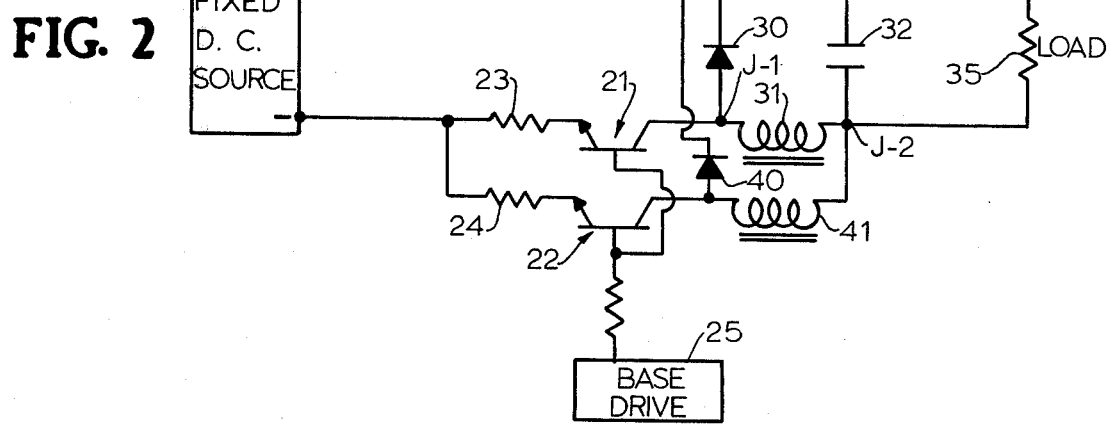
FIG. 2 illustrates in schematic form the invention circuitry arranged with dual filters and flyback diodes.
Figure 3:
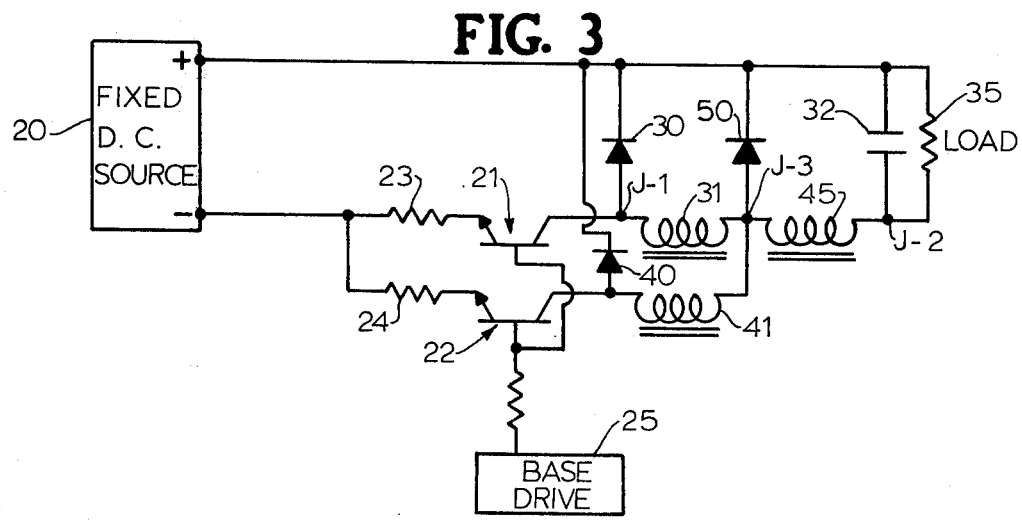
FIG. 3 represents an alternative embodiment utilizing an additional series inductor.

FIGS. 2 and 3 illustrate two separate embodiments of a switching regulator circuit according to the invention. To the extent that the components of FIGS. 2 and 3 duplicate the components of FIG. 1, similar numeral notations have been employed. In this regard, it may be noted in FIG. 2 that the fixed DC power supply 20 utilizes the switching transistors 21, 22, connected in parallel, emitter resistors 23, 24 and flyback diode 30. However, it will be noted that filter inductor 31 is connected so as to serve only transistor 21. It will also be noted that an additional flyback diode 40 and an additional filter inductor 41 have been added to the circuitry of FIG. 2 as compared to the circuitry of FIG. 1. Also, to be noted is the fact that the junction J1 as indicated in FIG. 1 and in FIG. 2 does not connect to the collector C of transistor 22 in FIG. 2 as it does in FIG. 1. Also to be noted is that the junction J2 indicated in FIGS. 1 and 2 connects, in FIG. 2, to both the filter inductor 31 as well as to the filter inductor 41.

Referring next to FIG. 3, it will be noted that the circuitry of FIG. 3 duplicates the circuitry of FIG. 2 and in addition includes filter inductor 45 between junctions J-2 and J-3 and which filter represents in electrical effect a composite of filters 31 and 41. A flyback diode 50 is preferably employed as shown.

In operation, the invention circuitry provides for each switching transistor, i.e., transistors 21, 22, to operate into its own respective filter. That is, as in FIG. 2, transistor 21 operates into filter 31 and transistor 22 operates into filter 41. It also is to be noted that each transistor is provided with a separate flyback diode, i.e. diodes 30, 40. Each respective flyback diode serves to conduct the current generated by the respective inductor with which it is associated, e.g., diode 30, inductor 31, during the time when the respective associated transistor is not conducting.

In actual circuitry built according to the invention, it was found that when all the transistors switched in a nearly coherent manner that the individual inductors, i.e., inductors 31, 41, appeared to the circuit as being in parallel and therefore the net inductance of these inductors was reduced proportional to the number of transistors units operating in parallel.

In some instances where a large number of transistors, e.g., greater than four, are operated in parallel, it has been found impractical to provide sufficient inductance in each respective inductor, e.g., inductor 31 or 41, to allow the inductors to operate in parallel. Therefore, as illustrated in FIG. 3, by use of the additional inductor 45 which represents in inductance, a composite of the inductance of the individual inductors 31 and 41 sufficient inductance is obtained. Inductor 45 is also designed and selected so as to have the capacity of handling the combined current of the other two inductors 31, 41. The individual switching capacity of transistors 21, 22 was found not to be hampered by this arrangement and a material reduction in the number of large inductors was obtained.

A further explanation and example related to FIG. 3 and the practice of operating a large number of transistors in parallel will be given.

A typical FIG. 3 type configuration for an individual switching element which operates at a current of 5 to 10 amperes and a voltage of 100 to 400 volts is a 10 ampere switching transistor and a 10 ampere flyback diode, each having voltage ratings of 500 to 600 volts. These two elements operate in conjunction with an inductor having an inductance of 5 millihenrys at a current of 5 amperes. If, for example, 10 of these switching elements are wired to operate in parallel, it is found that the transistors see an effective inductance equivalent to that provided by the composite of the inductors wired in parallel. This results in an effective lowering of the inductance and a failure of the circuit to operate properly. If the inductors are made high enough, so as to operate in parallel, the volume, size, and cost of the inductors becomes impracticable. However, tests of the FIG. 3 circuitry confirmed that the composite switching circuit could operate into a single inductor having a net inductance of perhaps 2 to 5 millihenrys at a current equal to the combined current of the parallel switching elements. The net effect of this new circuit is that the coherent components of the switching elements see an inductance equal to the inductance of the combined discrete inductors in parallel in series with the additional large inductor. However, the incoherent components of the individual switching transistor's waveform see the individual inductance of the inductor mated with the transistor which is providing the incoherent switching component. Since it is the incoherent switching component which results in the failure of a given transistor, the result of this new circuit is to adequately buffer each transistor from its load, so as to provide reliable service.

It has been found in practice that as many as three or four transistors can operate in a practical circuit with individual switching inductors and without the secondary inductor to provide coherent impedance. However, it has been proven impracticable to operate more than four transistors without the secondary inductor. If one looks at the waveforms of a switching circuit utilizing the secondary inductor, it is not at all obvious from these waveforms that such a circuit would operate properly. However, tests indicate the circuit to be highly reliable. This implies that a theoretical analysis of such a circuit is not trival.

It should be particularly noted that in accordance with the invention each transistor is operated into a separate inductor or filter on either the collector or emitter side (not shown) and that each transistor possesses its own flyback diode. It may also be noted that in a preferred embodiment, since the switched side of the transistor, according to the invention, is no longer operating in a common voltage mode, as in the prior art circuitry, with respect to the other circuit transistors, it is preferred that the switched side of the transistor be the collector. This eliminates the requirement for an independent base drive for each transistor.

What is claimed is:

1. In an electrical system requiring DC power at a regulated voltage, in combination:
 a. a fixed DC power source;
 b. an electrical load arranged to receive the regulated voltage;
 c. a pair of power switching transistors having collector, base and emitter connections and connected in parallel between said source and said load;
 d. base drive means connected to the respective base connections of said transistor;
 e. a pair of inductive type filters each being connected on one side to a common junction which in turn is connected to a first side of said electrical load with the other respective side of each said filter being connected to a respective selected one of said emitter and collector connections such that each said transistor provides current to said load through a separate said filter; and
 f. a pair of flyback diodes, said diodes being connected on one side to a common line which in turn is connected to a second side of said load and said diodes on their respective opposite sides having a respective connection to the selected one of said emitter and collector connections of a respective transistor to which a respective filter is connected and in a manner enabling the respective currents carried by each of said transistors to be equalized during the rise and fall times of the switching cycle of said regulator circuit and each respective flyback diode to conduct the current generated by the respective filter with which it is associated during the time when the respective associated transistor is not conducting.

2. A system as claimed in claim 1 including a filter capacitor connected in parallel with said load.

3. A system as claimed in claim 1 including an additional said inductive filter connected between the common junction of said first pair of filters and said first side of said load.

4. A system as claimed in claim 1 wherein each respective said filter connects to a respective collector connection of a respective said transistor.

5. A system as claimed in claim 1 including a resistor connected in series with each said emitter connection of each said transistor.

6. A system as claimed in claim 3 including a third flyback diode connected between said common line and said common junction.

7. A system as claimed in claim 4 including a resistor connected in series with each said emitter connection of each said transistor.

8. A system as claimed in claim 1 wherein each respective said filter connects to a respective collector connection of a respective said transistor and including a resistor connected in series with each said emitter connection of each said transistor.

9. In an electrical system requiring DC power at a regulated voltage in combination:
 a. a fixed DC power source;
 b. an electrical load arranged to receive the regulated voltage; and
 c. a switching regulator circuit connected between said source and load and providing said voltage to said load and including in the circuit thereof;
  i. a plurality of at least two transistors connected in parallel;
  ii. an inductor connected to each transistor; and
  iii. a flyback diode connected to each said transistor; each respective said inductor being interconnected with a respective said flyback diode and with a respective said transistor in a said flyback iode and with a respective said transistor in a manner enabling the respective currents carried by each of said transistors to be equalized during the rise and fall times of the switching cycle of said regulator circuit and each respective flyback diode to conduct the current generated by the respective inductor with which it is associated during the time when the respective associated transistor is not conducting.

* * * * *

UNITED STATES PATENT OFFICE
CERTIFICATE OF CORRECTION

Patent No. 4,017,745  Dated April 12, 1977

Inventor(s) William Henry McMahon

It is certified that error appears in the above-identified patent and that said Letters Patent are hereby corrected as shown below:

Col. 5, line 25, "transistor" should be --transistors--.

Col. 6, lines 38 and 39, "said flyback iode and with a respective said transistor in a" should be deleted.

Signed and Sealed this

Twenty-eighth Day of June 1977

[SEAL]

Attest:

RUTH C. MASON
Attesting Officer

C. MARSHALL DANN
Commissioner of Patents and Trademarks